(12) United States Patent
Hwang et al.

(10) Patent No.: US 8,136,619 B2
(45) Date of Patent: Mar. 20, 2012

(54) ATTACHMENT STRUCTURE OF PASSENGER DISTINGUISHING APPARATUS

(75) Inventors: Jae-Ho Hwang, Seongnam-si (KR); Byung-Hyuk Park, Yongin-si (KR); Myoung-Hun Kuem, Seongnam-si (KR); Byung-Yeol Kim, Yongin-si (KR)

(73) Assignee: HYUNDAI MOBIS Co., Ltd, Yongin-si, Gyeonggi-do (KR)

( * ) Notice: Subject to any disclaimer, the term of this patent is extended or adjusted under 35 U.S.C. 154(b) by 287 days.

(21) Appl. No.: 12/534,022

(22) Filed: Jul. 31, 2009

(65) Prior Publication Data

US 2010/0038150 A1 Feb. 18, 2010

(30) Foreign Application Priority Data

Aug. 18, 2008 (KR) ........................ 10-2008-0080597

(51) Int. Cl.
B60R 21/015 (2006.01)
(52) U.S. Cl. ........ 180/273; 280/735; 177/136; 177/144; 177/DIG. 9; 73/862.381
(58) Field of Classification Search .................. 177/136, 177/144, DIG. 9; 180/273; 280/735; 73/862.381
See application file for complete search history.

(56) References Cited

U.S. PATENT DOCUMENTS

| | | | |
|---|---|---|---|
| 4,411,325 A * | 10/1983 | Hamilton ..................... | 177/136 |
| 5,600,104 A * | 2/1997 | McCauley et al. ........... | 177/136 |
| 5,991,676 A * | 11/1999 | Podoloff et al. .............. | 701/45 |
| 6,555,765 B2 * | 4/2003 | Paine ............................ | 177/142 |
| 6,677,539 B2 * | 1/2004 | Miura et al. .................. | 177/136 |
| 6,931,947 B2 * | 8/2005 | Schulze et al. ........... | 73/862.381 |
| 7,038,146 B2 * | 5/2006 | Saito et al. .................... | 177/136 |
| 7,112,749 B2 * | 9/2006 | DiPaola et al. ............... | 177/136 |
| 7,189,931 B2 * | 3/2007 | Hida et al. .................... | 177/144 |
| 7,210,358 B2 * | 5/2007 | Yamazaki ...................... | 73/761 |
| 7,373,846 B2 * | 5/2008 | Furukawa et al. ....... | 73/862.621 |
| 7,455,343 B2 * | 11/2008 | Endo et al. ................... | 296/68.1 |
| 7,836,997 B2 * | 11/2010 | Takayasu et al. ............ | 180/273 |

FOREIGN PATENT DOCUMENTS

WO  WO 2006/109166  10/2006

* cited by examiner

*Primary Examiner* — Randy W Gibson
(74) *Attorney, Agent, or Firm* — Sherr & Vaughn, PLLC

(57) ABSTRACT

A passenger distinguishing apparatus is provided. The passenger distinguishing apparatus includes: a plurality of lower brackets that are fixed to a floor of a vehicle room; upper brackets that assist mounting of a passenger seat disposed at an upper part of the lower brackets; and a plurality of sensors that are disposed between the lower brackets and the upper brackets to detect a weight of a passenger seated in the passenger seat, wherein in an upper end part and a lower end part of the sensors, male screw threads for bolt-fastening to fastening holes formed at each of the lower bracket and the upper bracket are formed, and in at least one of the upper end part and the lower end part of the sensors, dampers for absorbing assembling tolerance of the sensors while being fixed due to a contact with nuts tightened and fixed to a portion in which the male screw threads are formed, are formed. Therefore, an assembling process can be improved, a cost can be reduced, and durability of the sensor can be improved.

17 Claims, 5 Drawing Sheets

ATTACHMENT STRUCTURE OF PASSENGER DISTINGUISHING APPARATUS

CROSS REFERENCE TO PRIOR APPLICATION

The present application claims priority under 35 U.S.C. 119 and 35 U.S.C. 365 to Korean Patent Application No. 10-2008-0080597 (filed on Aug. 18, 2008), which is hereby incorporated by reference in its entirety.

BACKGROUND OF THE INVENTION

1. Field of the Invention

The present invention relates a passenger distinguishing apparatus, and more particularly, to a passenger distinguishing apparatus that includes a damper for improving durability of a sensor and for increasing a coupling force of the sensor while solving assembling tolerance occurring when assembling the sensor.

2. Description of the Related Art

An air bag device is a device for protecting passengers within vehicles by absorbing a physical impact occurring when vehicles collide using elasticity of an air cushion and is classified into a driver seat air bag device, a passenger seat air bag device, and a side air bag device.

When a gas is injected into the air cushion upon collision of vehicles, the air cushion inflates in a high speed in order to protect a passenger, and thus when the passenger seated in a passenger seat is a child or an adult having a light weight, due to an impact by inflation of the air bag cushion, the passenger may be injured.

Therefore, it is necessary to determine inflation of the air bag cushion in consideration of the passenger's weight, and thus North America countries have a separate legal standard for limiting inflation of an air bag cushion according to a passenger's weight measured in a passenger seat in various conditions.

Therefore, an air bag apparatus manufacturer should provide means for satisfying these conditions in order to improve a performance of an air bag device and to export to North America countries. For this, conventionally, by providing four or more sensors in the passenger seat, when a passenger is seated, a passenger's weight is measured, and by comparing the sum of load values measured in sensors with a reference value, inflation of the air bag cushion is determined.

FIG. 1 is a cross-sectional view illustrating a passenger distinguishing apparatus in the prior art.

Referring to FIG. 1, a lower bracket 5 for mounting a passenger seat (not shown) is fixed to a floor within a vehicle. An upper bracket 10 for assisting mounting of the passenger seat is disposed at an upper part of the lower bracket 5. In order to effectively support the passenger seat, the lower bracket 5 and the upper bracket 10 are generally disposed at four corners of a lower part of the passenger seat. A sensor 15 for detecting a weight of a passenger seated in the passenger seat is disposed between the lower bracket 5 and the upper bracket 10.

Specifically, an upper end part 15b and a lower end part 15a of the sensor 15 are vertically protruded, and threads 15c and 15d are formed in the upper end part 15b and the lower end part 15a. Fastening holes 5a and 5b for inserting and bolt-fastening the lower bracket 5 and the upper bracket 10 are formed in the lower bracket 5 and the upper bracket 10. In the sensor 15 disposed between the lower bracket 5 and the upper bracket 10, when the upper end part 15b and the lower end part 15a of the sensor 15 are inserted into and protruded from the fastening holes 5a and 5b, respectively, nuts 20a and 20b for tightening and fixing the upper end part 15b and the lower end part 15a, respectively of the sensor 15 are disposed at a portion corresponding to the rear surface of the lower bracket 5 and the upper bracket 10.

However, as already known, when producing parts, almost all parts have somewhat tolerance and in a product having an assembling process, in order to reduce inconvenience upon assembling, the product is manufactured to have somewhat tolerance. Similarly, when mounting the sensor 15 in the lower bracket 5 and the upper bracket 10, the sensor 15 is also manufactured to have predetermined tolerance, however assembling tolerance of the sensor 15 may cause the result contrary to an installation purpose of the sensor 15 for accurately detecting a weight of a passenger seated in the passenger seat. In other words, by putting predetermined assembling tolerance in the sensor 15, if assembling tolerance is not absorbed in an assembling process, due to a shaft load, or a stacking load such as a moment, error occurs, in the sensor 15 designed to measure a vertical load, or due to a continued vibration occurring when operating the vehicle, the sensor 15 has a clearance and thus there is a problem that durability of the sensor 15 is influenced.

In order to solve such a problem, conventionally, as shown in FIG. 1, a pair of dampers 25 for enclosing an end part of the fastening hole 5b are disposed in at least one of the upper end part 15b and the lower end part 15a of the sensor 15, and in order to prevent shaking of the damper 25, a pair of sleeves 30 closely contact with the damper 25.

However, because the damper 25 and a sleeve 30 disposed to absorb assembling tolerance should be provided with a pair in each sensor 15, when it is assumed that the sensors 15 are disposed at each of four corners of the passenger seat, the damper 25 and the sleeve 30 should be provided with eight pieces and thus there is a problem that a cost greatly increases.

Further, as a height of a pair of damper 25 and sleeve 30 greatly increases, the screw thread 15d tightened and fixed by the nuts 20a and 20b reduces and thus there is an additional problem that a fixing force of the sensor 15 reduces.

SUMMARY OF THE INVENTION

The present invention has been made in an effort to solve the above problems, and the present invention provides a passenger distinguishing apparatus that can improve durability of a sensor while absorbing assembling tolerance of the sensor and that can increase a coupling force.

According to an aspect of the present invention, there is provided a passenger distinguishing apparatus including: lower brackets that are fixed to a floor of a vehicle room; upper brackets that assist mounting of a passenger seat disposed at an upper part of the lower brackets; and a plurality of sensors that are disposed between the lower brackets and the upper brackets to detect a weight of a passenger seated in the passenger seat, wherein in an upper end part and a lower end part of the sensors, male screw threads for bolt-fastening to fastening holes formed at each of the lower bracket and the upper bracket are formed, and in at least one of the upper end part and the lower end part of the sensors, dampers for absorbing assembling tolerance of the sensors while being fixed due to a contact with nuts tightened and fixed to a portion in which the male screw threads are formed, are formed.

A sleeve for guiding to prevent shaking of the dampers may be disposed between the dampers and the upper end part or the lower end part of the sensors at which the dampers are disposed.

The damper may be formed in a shape of a ring inserted into at least one of the upper end part or the lower end part of the sensors.

A forming part in which an outer circumferential diameter of the dampers gradually increases as advancing toward the downside from the nut may be formed in the damper.

An end part of a fastening hole of a side at which the dampers are disposed among the fastening holes formed at each of the upper brackets or the lower brackets may be formed to surface-match to an external side surface of the forming part.

BRIEF DESCRIPTION OF THE DRAWINGS

The objects, features and advantages of the present invention will be more apparent from the following detailed description in conjunction with the accompanying drawings, in which.

DESCRIPTION OF THE PREFERRED EMBODIMENT

Hereinafter, exemplary embodiments of a passenger distinguishing apparatus according to the present invention will be described in detail with reference to the accompanying drawings.

Figure 1:
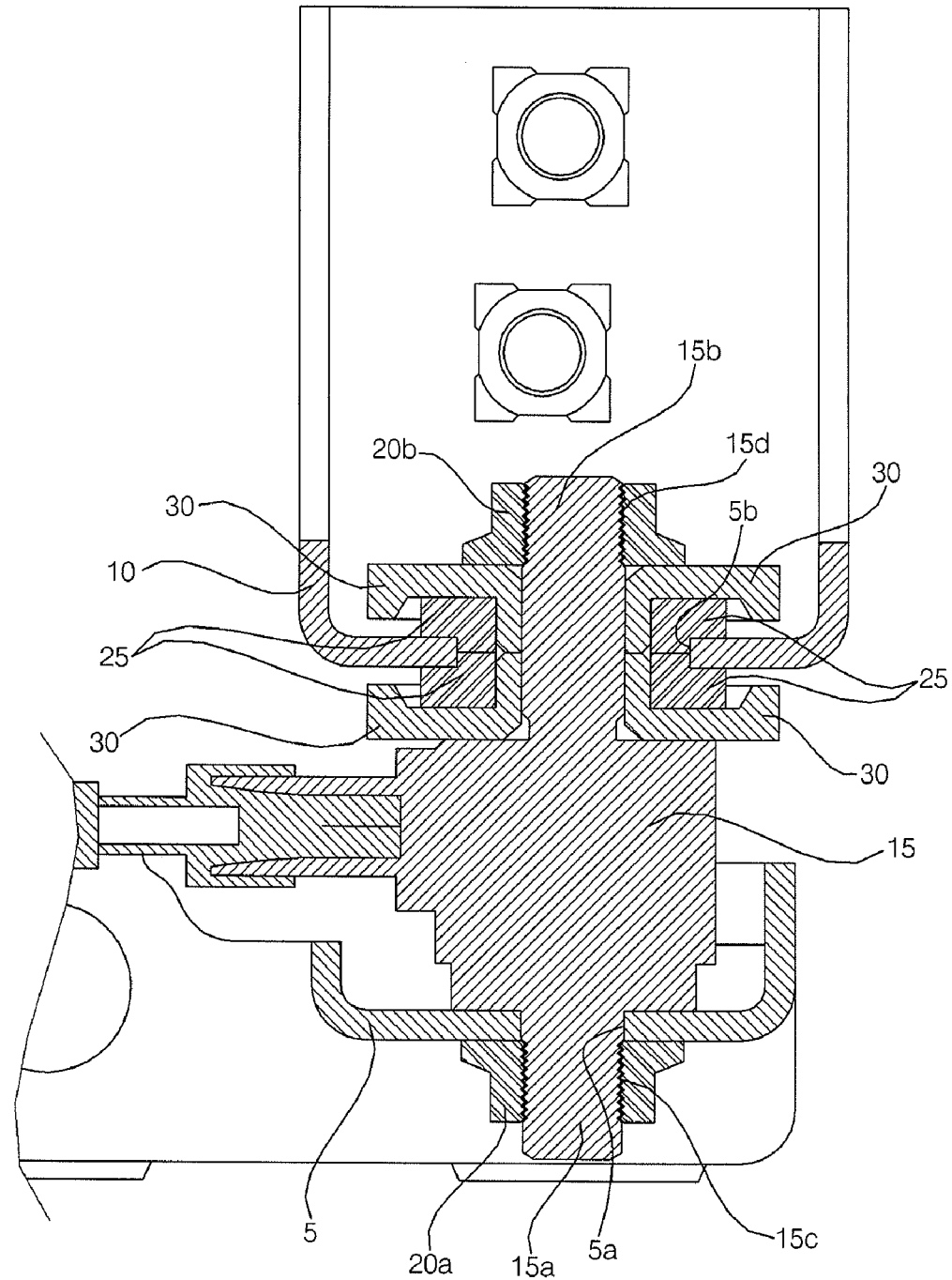
FIG. 1 is a cross-sectional view illustrating a passenger distinguishing apparatus in the prior art.
Figure 2:
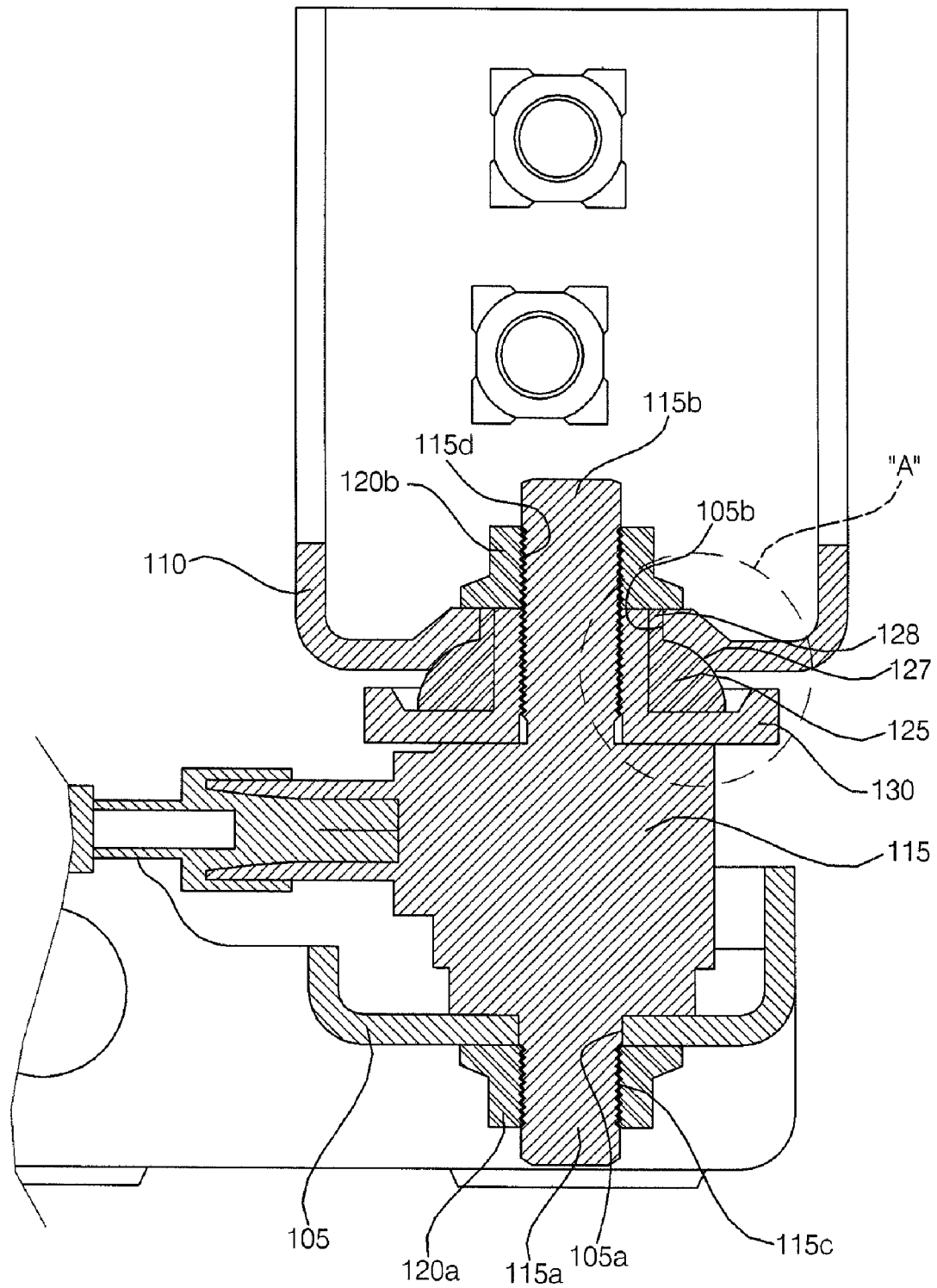
FIG. 2 is a cross-sectional view illustrating an exemplary embodiment of a passenger distinguishing apparatus according to the present invention.
Figure 3:
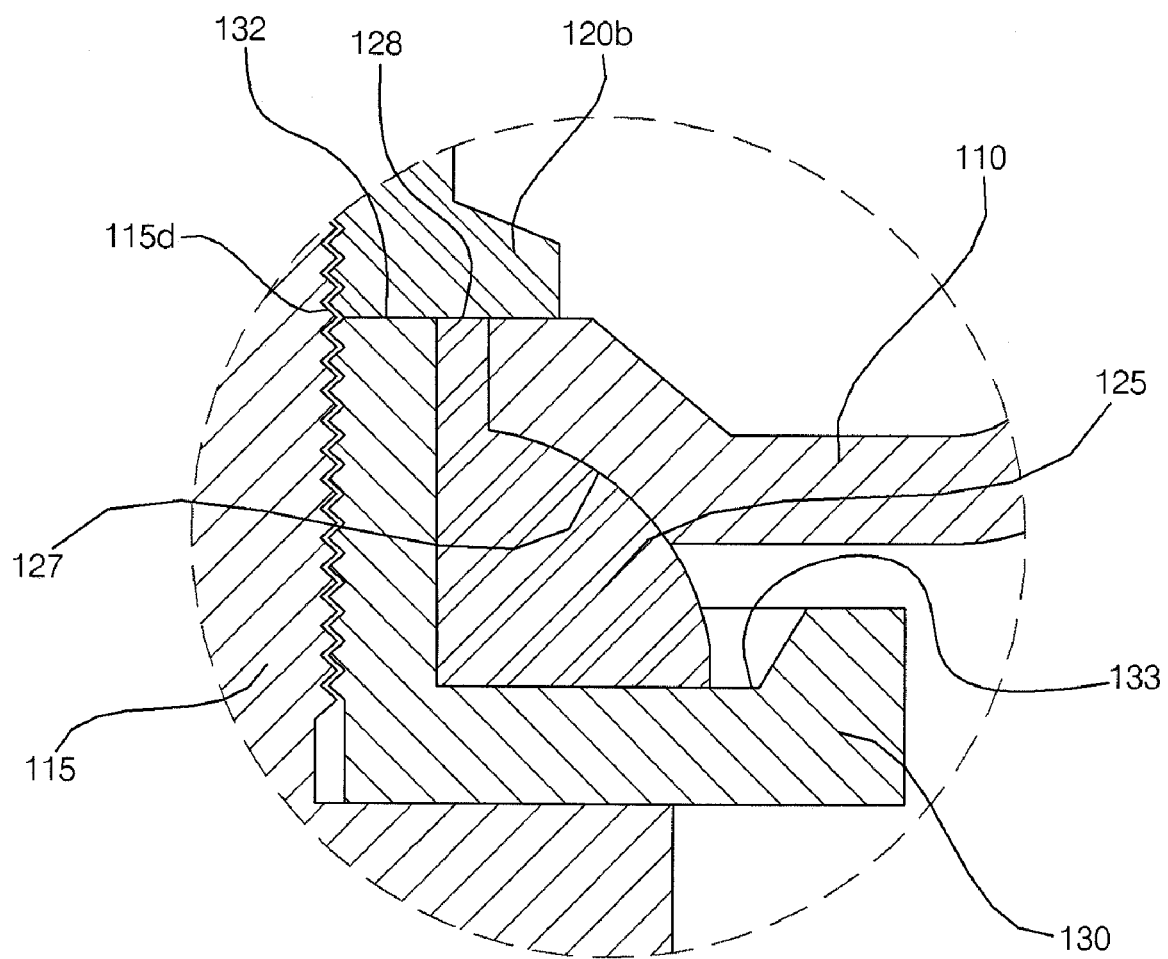
FIG. 3 is an enlarged view of a portion 'A' of FIG. 2.

FIG. 2 is a cross-sectional view illustrating an exemplary embodiment of a passenger distinguishing apparatus according to the present invention, and FIG. 3 is an enlarged view of a portion 'A' of FIG. 2.

Referring to FIGS. 2 and 3, the passenger distinguishing apparatus includes a lower bracket 105 that is fixed to a floor of a vehicle room, an upper bracket 110 that is disposed at an upper part of the lower bracket 105 to assist mounting of a passenger seat, and a plurality of sensors 115 that are disposed between the lower bracket 105 and the upper bracket 110 to detect a weight of a passenger seated in the passenger seat.

The lower bracket 105 is disposed at four corners of a lower part of the passenger seat in order to effectively support the passenger seat. A predetermined size of fastening hole 105a that is vertically penetrated is formed in the lower bracket 105.

The upper bracket 110 is a constituent element for assisting mounting of the passenger seat in the lower bracket 105, is coupled to a corner of a lower part of the passenger seat, and corresponds to the lower bracket 105 to be disposed at a corner of a lower part of the passenger seat.

Similarly to the lower bracket 105, a predetermined size of fastening hole 105b that is vertically penetrated is formed even in the upper bracket 110.

The sensor 115 is coupled between the lower bracket 105 and the upper bracket 110.

Specifically, in the sensor 115, a lower end part 115a that is protruded toward the lower bracket 105 and in which a male screw thread 115c is formed in a part of an outer circumference thereof to be coupled to the fastening hole 105a of the lower bracket 105, and an upper end part 115b that is protruded toward the upper bracket 110 and in which a male screw thread 115d is formed in a part of an outer circumference thereof to be coupled to the fastening hole 105b of the upper bracket 110 are formed.

The lower end part 115a and the upper end part 115b of the sensor 115 are bolt-fastened to the fastening hole 105a of the lower bracket 105 and the fastening hole 105b of the upper bracket 110, respectively.

Figure 4:
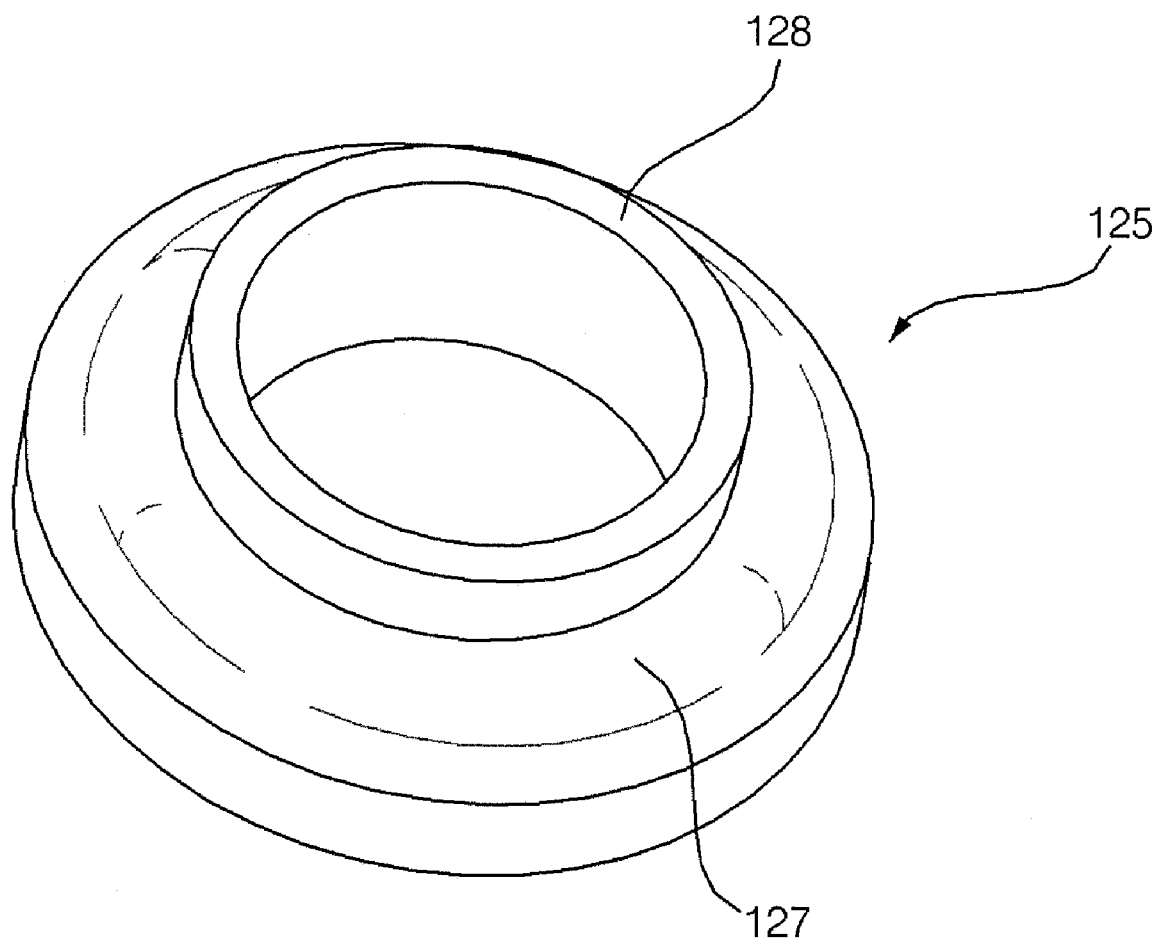
FIG. 4 is a perspective view illustrating a damper shown in FIG. 2.

FIG. 4 is a perspective view illustrating a damper 125 shown in FIG. 2.

Referring to FIG. 4, the damper 125 for absorbing assembling tolerance of the sensor 115 is disposed in at least one of the lower end part 115a and the upper end part 115b of the sensor 115. The damper 125 is formed in a shape of a ring inserted into an outer circumference of the lower end part 115a or the upper end part 115b of the sensor 115.

In an exemplary embodiment of the present invention, the damper 125 is inserted into an outer circumference of the upper end part 115b among the upper end part 115b and the lower end part 115a of the sensor 115, however the present invention is not limited thereto and the damper 125 may be inserted into an outer circumference of the lower end part 115a of the sensor 115.

Preferably, when the sensor 115 is a strain gauge sensor 115, a physical deformation amount (phase difference) due to a weight of a passenger seated in the passenger seat is converted to a voltage and is displayed, and because an influence due to a weight of the passenger transferred through the upper end part 115a is large, it is preferable that the damper 125 is inserted into the upper end part 115a of the sensor 115, however even if the damper 125 is inserted into the lower end part 115b, the damper 125 performs the same function.

The damper 125 is made of a rubber material that can easily absorb assembling tolerance of the sensor 115, however a material of the damper 125 is not limited thereto. That is, the damper 125 may be made of any material that can absorb assembling tolerance of the sensor 115.

When the lower end part 115a and the upper end part 115b of the sensor 115 are inserted into and fastened to the fastening holes 105a and 105b, respectively formed in the lower bracket 105 and the upper bracket 110, a part of the lower end part 115a and the upper end part 115b of the sensor 115 in which the male screw threads 115c and 115d are formed is protruded to a portion corresponding to the rear surface of the lower bracket 105 and the upper bracket 110 through the fastening holes 105a and 105b. As nuts 120a and 120b having a female screw thread 120c (not shown) are tightened to the male screw threads 115c and 115d formed in the protruded lower end part 115a and upper end part 115b, respectively of the sensor 115, the sensor 115 is securely fixed and the passenger seat is fixed to the lower bracket 105 by the upper bracket 110.

When the nut 120b is fastened to the upper end part 115b of the sensor 115, an upper end part 128 of the damper 125 contacts with a lower part of the nut 120b and protrudes to the upside by a predetermined height in order to completely absorb assembling tolerance of the sensor 115.

A forming part 127 in which an outer circumferential diameter of the damper 125 gradually increases as advancing toward the downside from the nut 120b fastened to the upper end part 115b of the sensor 115 is formed in the damper 125.

As an end part of the fastening hole 105b of the upper bracket 110 contacts with a relatively wide area, the forming part 127 is formed to absorb assembling tolerance of the sensor 115.

In the prior art, in order to effectively absorb assembling tolerance of the sensor 15, two dampers 25 are vertically disposed so that an end part of the fastening hole 5b contacts with the damper 25 in a wider area, and the end part of the fastening hole 5b encloses an outer circumferential groove formed while two dampers 25 are disposed. However, as described in the 'Description of the Related Art', because two dampers 25 should be provided in each sensor 15, there was a problem that a cost increases.

In the present invention, in order to improve a cost increasing problem, the forming part 127 is formed in the damper 125 so that the end part of the fastening hole 105b contacts with the damper 125 in a widest area. The forming part 127 is formed to have a curved cross-section.

Further, the end part of the fastening hole 105b contacting with the forming part 127 is also formed in a shape to surface-match to an outer circumference of the forming part 127. In this case, because an upper end of the end part of the fastening hole 105b is formed in a height corresponding to that of the upper end part 128 of the damper 125, if the nut 120b is tightened and fixed to the upper end part 115b of the sensor 115, the end part of the fastening hole 105b formed in a shape to surface-match to an outer circumference of the forming part 127 contacts with the forming part 127 in a wide area, and the upper end of the fastening hole 105b completely absorbs assembling tolerance of the sensor 115 while contacting with a lower end part of the nut 120b.

Figure 5:
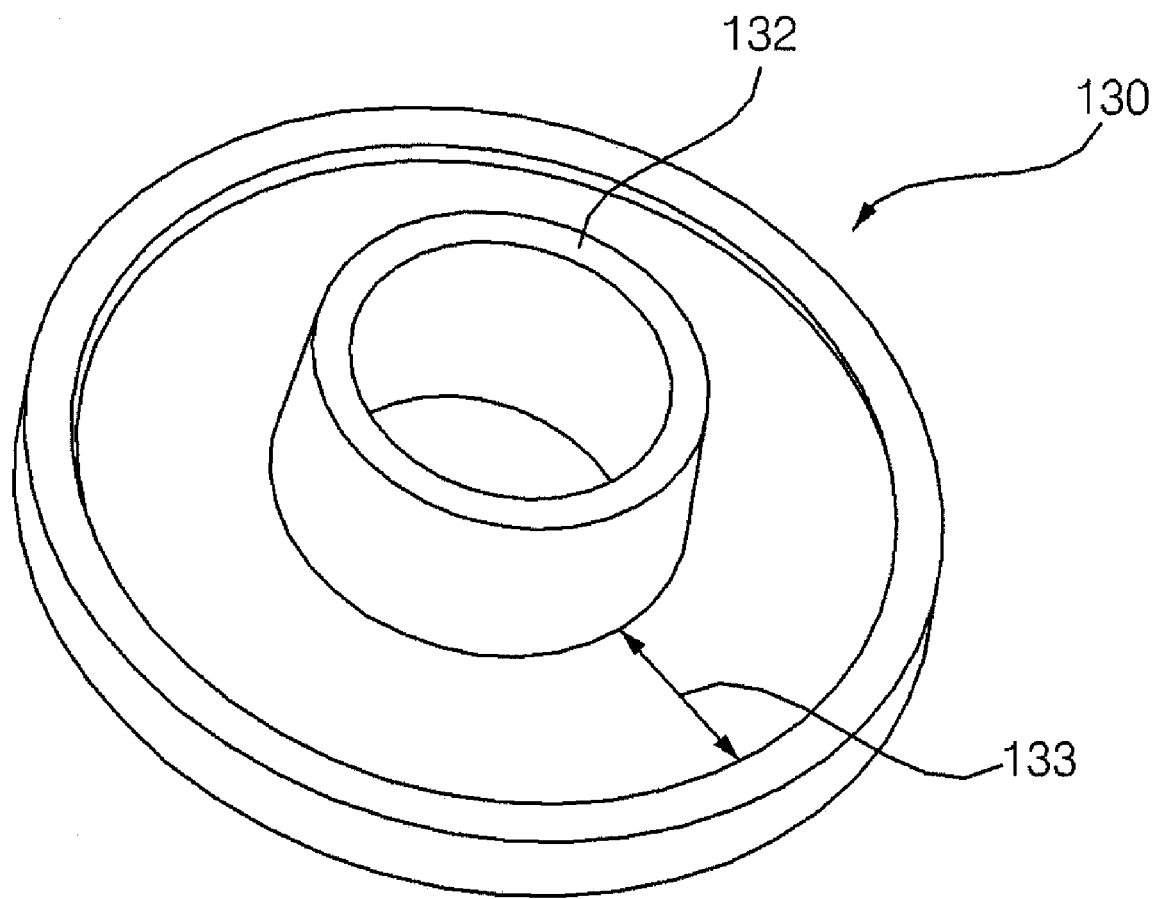
FIG. 5 is a perspective view illustrating a sleeve shown in FIG. 2.

FIG. 5 is a perspective view illustrating a sleeve 130 shown in FIG. 2.

Referring to FIG. 5, a sleeve 130 for guiding to prevent shaking of the damper 125 is disposed between the damper 125 and an outer circumference of the upper end part 115b of the sensor 115.

In an exemplary embodiment of the present invention, the sleeve 130 is independently formed and disposed at the sensor 115 in order to guide the damper 125, however the present invention is not limited thereto. That is, the sleeve 130 may be integrally formed with the sensor 115 in order to guide the damper 125.

The sleeve 130 may be formed in a shape of a ring inserted into an outer circumference of the upper end part 115b of the sensor 115. In this case, a hollow hole (see FIG. 5) for inserting the upper end part 115b of the sensor 115 is formed in an intermediate portion of the sleeve 130. In an inner circumference surface of the hollow hole, a female screw thread corresponding to a male screw thread formed in the upper end part 115b of the sensor 115 is formed. Further, in an upper surface of the sleeve 130, a ring groove 133 for guiding arriving of a lower end surface of the damper 125 is formed.

Conventionally, a pair of sleeves 130 having the same shape in each sensor 115 were disposed apart in an upper part and a lower part of a pair of dampers 125, however in the present exemplary embodiment, due to a shape of an end part of the fastening hole 105b of the upper bracket 110 formed to surface-match to the forming part 127 and an outer circumference of the forming part 127, because only one sleeve 130 of one damper 125 is provided in each sensor 115, a cost can be reduced.

Further, because an occupying height of the damper 125 and the sleeve 130 is relatively small, a height of the male screw thread 115d to be formed in the upper end part 115b of the sensor 115 can be fully secured and thus a coupling force of the sensor 115 can be increased.

Further, because the end part of the fastening hole 105b of the upper bracket 110 contacts with a shape surface of the forming part 127 of the damper 125 in a relative wide area, a vibration that may be occurred when a vehicle operates, or when a passenger abnormally seats can be fully reduced and thus durability of the sensor 115 can be improved.

In a passenger distinguishing apparatus according to the present invention, because it is necessary that only one damper and one sleeve for absorbing assembling tolerance of a sensor are provided in each sensor, a cost can be reduced.

Further, because a coupling force of the sensor can be increased, an error factor of a stacking load occurred by tolerance can be reduced and durability of the sensor can be improved.

The embodiment of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An attachment structure of a passenger distinguishing apparatus, comprising:
   a lower bracket that is connected to a floor of a vehicle room;
   an upper bracket that is connected to a passenger seat;
   a sensor that is connected to the lower bracket and the upper bracket to detect a weight of a passenger, wherein the sensor is disposed perpendicularly relative to the floor of the vehicle room;
   at least one nut that is threaded with at least one of an upper end part and a lower end part of the sensor such that the sensor is fixed to at least one bracket; and
   a damper that is disposed between the at least one nut and at least one of the upper end part and the lower end part of the sensor such that the damper is in direct contact with the at least one nut,
   wherein ends of one of the upper bracket and the lower bracket is disposed between at least a portion of the nut and at least a first portion of the damper.

2. The attachment structure of the passenger distinguishing apparatus of claim 1, wherein the damper is positioned below the at least one nut.

3. The attachment structure of the passenger distinguishing apparatus of claim 1, wherein a sleeve for preventing shaking of the dampers is disposed between the damper and one of the upper end part and the lower end part of the sensor at which the damper is disposed.

4. The attachment structure of the passenger distinguishing apparatus of claim 1, wherein the damper is formed in a shape of a ring, and is inserted into at least one of the upper end part and the lower end part of the sensor.

5. The attachment structure of the passenger distinguishing apparatus of claim 1, wherein an articulated portion of the damper, which is at least partially coextensive with said first portion of the damper, has an outer circumferential diameter which gradually increases with increasing distance from the portion of the damper that is in direct contact with the at least one nut.

6. The attachment structure of the passenger distinguishing apparatus of claim 3, wherein the damper is disposed between the sleeve and the end part of the bracket.

7. The attachment structure of the passenger distinguishing apparatus of claim 3, wherein the sleeve is threaded with one of the upper and lower brackets.

8. The attachment structure of the passenger distinguishing apparatus of claim 5, wherein the one end of the upper and lower brackets disposed between the nut and said first portion of the damper is contoured to be in contact with said articulated portion of the damper.

9. The attachment structure of the passenger distinguishing apparatus of claim 1, wherein the damper is made of rubber.

10. An attachment structure of a passenger distinguishing apparatus, comprising:
- a weight detection sensor which detects a weight of a passenger seated in the vehicle seat;
- a lower bracket provided at a lower end of the weight detection sensor;
- an upper bracket provided at an upper end of the weight detection sensor;
- at least one nut that is threaded with at least one of an upper end part and a lower end part of the weight detection sensor such that the weight detection sensor is fixed to at least one of the lower bracket and the upper bracket; and
- a damper which absorbs an assembling tolerance of the weight detection sensor and is concentrically received at the upper end of the weight detection sensor, the damper comprising a damper body at a lower end thereof and a damper extension at an upper end thereof, wherein the damper body and the damper extension each directly contact the upper bracket, and the upper bracket is placed between the nut and the damper body.

11. The attachment structure of the passenger distinguishing apparatus of claim 10, wherein the nut directly contacts each bracket, respectively, and the damper extension.

12. The attachment structure of the passenger distinguishing apparatus of claim 10, further comprising a sleeve concentrically received at the upper end of the weight detection sensor to prevent movement of the damper.

13. The attachment structure of the passenger distinguishing apparatus of claim 12, wherein the damper body and damper extension directly contacts the sleeve.

14. The attachment structure of the passenger distinguishing apparatus of claim 12, wherein the sleeve has a groove formed in an upper surface thereof that receives and directly contacts a lowermost surface of the damper body.

15. The attachment structure of the passenger distinguishing apparatus of claim 10, wherein the circumference of the damper gradually decreases from the damper body to the damper extension.

16. The attachment structure of the passenger distinguishing apparatus of claim 10, wherein the sensor is disposed perpendicularly to the uppermost surface of a floor of the vehicle.

17. An attachment structure of a passenger distinguishing apparatus, comprising:
- a lower bracket connected to a floor of the vehicle;
- an upper bracket connected to the vehicle seat;
- a weight detection sensor to detect a weight of a passenger seated in the vehicle seat;
- at least one nut that is threaded with at least one of an upper end part and a lower end part of the weight detection sensor such that the weight detection sensor is fixed to at least one of the lower bracket and the upper bracket;
- a sleeve concentrically received by and directly contacting the weight detection sensor, the sleeve comprising an upper sleeve portion and a lower sleeve portion having a groove formed in an upper surface thereof and having sidewalls, the lower sleeve portion having a circumference greater than the circumference of the upper sleeve portion; and
- a damper provided at the groove and concentrically disposed between the sleeve and the upper bracket and directly contacting the sleeve, the upper bracket, and the nut.

\* \* \* \* \*